Patented Jan. 12, 1937

2,067,304

UNITED STATES PATENT OFFICE 2,067,304

MANUFACTURE OF ARTIFICIAL RUBBER-LIKE MASSES

Eduard Tschunkur and Walter Bock, Cologne-Mulheim, Germany, assignors to I. G. Farbenindustrie Aktiengesellschaft, Frankfort-on-the-Main, Germany No Drawing. Application July 15, 1931, Serial No. 551,056. In Germany July 21, 1930

5 Claims. (Cl. 260—6)

This invention relates to the manufacture of artificial rubber-like masses.

It is known that hydrocarbons suitable for the manufacture of artificial rubber-like masses, such as butadiene-(1.3) and homologues thereof, can be polymerized according to emulsion processes with or without the addition of substances capable of accelerating the polymerization process. In all of these processes aqueous solutions of emulsifying agents are employed with which the rubber hydrocarbons are emulsified after which polymerization is proceeded with.

As a result of further investigation and research and in accordance with the present invention rubber hydrocarbons, such as those mentioned above, are polymerized in a short time in the presence of substances exerting an emulsifying action by employing the emulsifying agent not in aqueous solution but only in the presence of a small quantity of water insufficient for complete solution of the emulsifying agent, say in the presence of water up to about 10% (calculated on the amount of the hydrocarbon to be polymerized). Favorably, we are working with about 1–5% of water. In this case no formation of an emulsion can take place, since the small quantities of water can at most cause a swelling of the emulsifying agent, and, consequently, a liquid aqueous phase cannot be present in the mixture.

The moist substances exerting an emulsifying action are capable of polymerizing the rubber hydrocarbons and also mixtures thereof with other substances capable of being polymerized in a short time, particularly in the case, when, in addition to the above mentioned substances, compounds operating to accelerate the polymerization process are incorporated within the polymerization mixture, such as for example, highly chlorinated aliphatic compounds, colloidal metal oxides, organic ethers, esters, hydrocarbons, oxygen or compounds yielding oxygen, salts of fatty acids soluble in hydrocarbons and the like. In this respect numerous very efficacious combinations are possible between the substances accelerating the polymerization and the substances exerting an emulsifying action. The latter substances can be of all known varieties, such as for example, albuminous compounds, salts of fatty acids or sulfo fatty acids, alkali metal salts of alkyl substituted aromatic sulfonic acids exerting an emulsifying action, salts of high molecular bases with inorganic or organic acids, saponine and the like. Depending on their more specific character they can be employed with success in an acid, neutral or alkaline medium. It frequently suffices to use the said substances in the atmospherically moist state or in conjunction with moist rubber hydrocarbons in order to effect the polymerization in a satisfactory manner. Completely anhydrous mixtures do not, however, polymerize. For this reason, it might be assumed that the polymerization is effected by the actual emulsion of the hydrocarbons, though this be small. It is, however, noteworthy that charges which have not been agitated either before or during the polymerization (remaining in a state of rest), and in which it is practically certain that no emulsion is present, likewise polymerize. The accelerating action of the moist emulsifying agents on the polymerization reaction seems therefore to be purely catalytic.

The rubber hydrocarbons can be polymerized according to the present process as such or in admixture with one another, and likewise in admixture with other substances capable of polymerization, such as for example, olefine benzenes, unsaturated ketones, acids, esters, nitriles and the like, whereby mixed polymerization products of particular technical value are produced. The resulting products resemble to some degree the emulsion rubbers, but in some cases they are more plastic, and resemble the artificial rubbers obtained by the simple heating of rubber hydrocarbons. Again some of the artificial rubber-like masses dissolve in rubber solvents, and are also distinguished in other respects by properties deviating from those possessed by ordinary emulsion polymerization products.

While in the aqueous emulsion processes artificial varieties of latex are mostly obtained, from which the polymerization products have first to be worked up in a more or less cumbersome manner, for example, by coagulating, pressing and drying, the products of the present process are practically obtained directly in the dry state and are thus ready for rolling, as the result of which a very important technical advance is attained.

The following examples illustrate the invention, without, however, limiting it thereto, the parts being by weight:—

Example 1

150 parts of butadiene-(1.3), 15 parts of sodium stearate and 10 parts of water are polymerized with agitation for 9–10 days at a temperature of 60–70° C. A strongly coherent polymerization product is thus obtained in a yield of about 60% of the theoretical amount.

Example 2

150 parts of butadiene-(1.3), 10 parts of saponine, 3 parts of trichloroacetic acid and 5 parts of water are polymerized with agitation at about 60° C. for 8 days. A reddish polymerization product is produced with a yield of approximately 90%, which rolls out directly on the rollers to a plastic skin.

Example 3

10 parts of saponine are moistened with 3 parts of water, 3 parts of trichloroacetic acid are added and, furthermore, 105 parts of butadiene mixed with 45 parts of styrol. The resulting mixture is polymerized without stirring or shaking at about 60° C. for about 8 days. A transparent technically valuable mixed polymerization product is obtained in a yield of approximately 95%, which rolls out directly on the rollers to a plastic skin.

Example 4

50 parts of butadiene, 6 parts of beta-vinyl-tetrahydronaphthalene (the vinyl group is in the aromatic nucleus), 5 parts of saponine, 1,5 parts of trichloroacetic acid and 2 parts of water are polymerized with agitation at about 60° C. for 7 days. A transparent plastic polymerization product is obtained in a yield of 83%.

Example 5

100 parts of butadiene, 50 parts of styrol, 10 parts of casein, (technically air-dry product, containing about 12 to 13% water) and 10 parts of trichloroacetic acid are agitated at about 60° C. for 14 days. A plastic polymerization product is thus produced in a yield of about 86 to 87%, which is soluble in benzene or toluene.

By employing in this charge anhydrous casein and 10 parts of water under otherwise similar conditions a polymerization product is produced in a yield of about 92% in 8 days.

Example 6

The hydrocarbon charge of Example 5 produces with 10 parts of egg albumen, 0.3 part of colloidal pyrolusite and 5 parts of water at about 50° C. in 3–4 days a plastic polymerization product in a quantitative yield.

Example 7

105 parts of butadiene, 45 parts of styrol, 10 parts of sodium stearate, 5 parts of amyl ether and 5 parts of normal aqueous caustic soda solution are polymerized with agitation at about 60° C. for 10 days. A strongly coherent polymerization product is thus obtained in a yield of about 86%, which rolls out directly to a plastic skin.

Example 8

The hydrocarbon charge employed in Example 6 produces with 10 parts of sodium stearate, 3 parts of hexachloroethane and 3 parts of water at about 60° C. in about 10 days a valuable polymerization product in a quantitative yield.

Example 9

A mixture consisting of 100 parts of butadiene and 100 parts of dimethyl butadiene, when polymerized according to Example 8, produces a plastic mixed polymerization product in a quantitative yield.

We claim:—

1. Process of preparing artificial rubber-like masses which comprises polymerizing a butadiene compound of the group consisting of butadiene-(1.3) and alkyl-substituted butadienes in the presence of a salt of the group consisting of salts of fatty acids, salts of sulfo fatty acids, alkali metal salts of alkyl-substituted aromatic sulfonic acids and salts of high molecular bases with inorganic and organic acids, and in the presence of water, the salt being present in an amount sufficient to exert an emulsifying action and a polymerization-exerting effect, and the water being present in an amount insufficient to effect complete solution of the salt and for the formation of an emulsion.

2. Process as defined in claim 1 in which the amount of water present does not exceed 10% by weight of the amount of butadiene compound employed.

3. Process of preparing artificial rubber-like masses which comprises polymerizing a butadiene compound of the group consisting of butadiene-(1.3) and alkyl-substituted butadienes in the presence of an alkali metal salt of a fatty acid, and in the presence of water, the salt being present in an amount sufficient to exert an emulsifying action and a polymerization-exerting effect, and the water being present in an amount insufficient to effect complete solution of the salt and for the formation of an emulsion.

4. The polymerization products obtained in accordance with the process claimed in claim 1, said polymerization products possessing rubber-like properties.

5. The polymerization products obtained in accordance with the process claimed in claim 3, said polymerization products possessing rubber-like properties.

EDUARD TSCHUNKUR.
WALTER BOCK.